(12) United States Patent
Wikaryasz et al.

(10) Patent No.: US 8,609,030 B2
(45) Date of Patent: Dec. 17, 2013

(54) EXHAUST AFTERTREATMENT DEVICE WITH INTEGRATED SHELL AND BAFFLE

(75) Inventors: Megan Wikaryasz, Ypsilanti, MI (US); Douglas Otrompke, Ypsilanti, MI (US)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 410 days.

(21) Appl. No.: 13/040,623

(22) Filed: Mar. 4, 2011

(65) Prior Publication Data

US 2012/0222767 A1    Sep. 6, 2012

(51) Int. Cl.
*B01D 50/00*    (2006.01)

(52) U.S. Cl.
USPC ............................................ 422/179; 422/180

(58) Field of Classification Search
USPC ................................................. 422/177, 180
See application file for complete search history.

(56) References Cited

U.S. PATENT DOCUMENTS

| | | | |
|---|---|---|---|
| 5,055,274 A | 10/1991 | Abbott | |
| 5,220,137 A | 6/1993 | Howerton | |
| 5,482,681 A | 1/1996 | Sager, Jr. | |
| 6,651,773 B1 | 11/2003 | Marocco | |
| 7,628,011 B2 | 12/2009 | Crawley et al. | |
| 7,797,927 B2 | 9/2010 | Nagaoka et al. | |
| 2009/0272106 A1* | 11/2009 | Werni et al. | 60/297 |
| 2011/0023471 A1* | 2/2011 | Werni et al. | 60/297 |
| 2011/0203692 A1* | 8/2011 | Werni et al. | 138/37 |
| 2013/0086894 A1* | 4/2013 | Wikaryasz et al. | 60/282 |

FOREIGN PATENT DOCUMENTS

EP    1050670    11/2000

* cited by examiner

*Primary Examiner* — Tom Duong
(74) *Attorney, Agent, or Firm* — Harness, Dickey & Pierce, P.L.C.

(57) ABSTRACT

An exhaust treatment device includes an inner shell, an outer shell and insulation material positioned between the inner shell and the outer shell. An inlet tube has an end in communication with a cavity defined by the inner shell. A substrate for treating engine exhaust is positioned within the inner shell. A baffle plate includes a plurality of apertures positioned such that the exhaust passes through the apertures prior to entering the substrate. The baffle plate supports an end of the inner shell and the inlet tube.

17 Claims, 5 Drawing Sheets

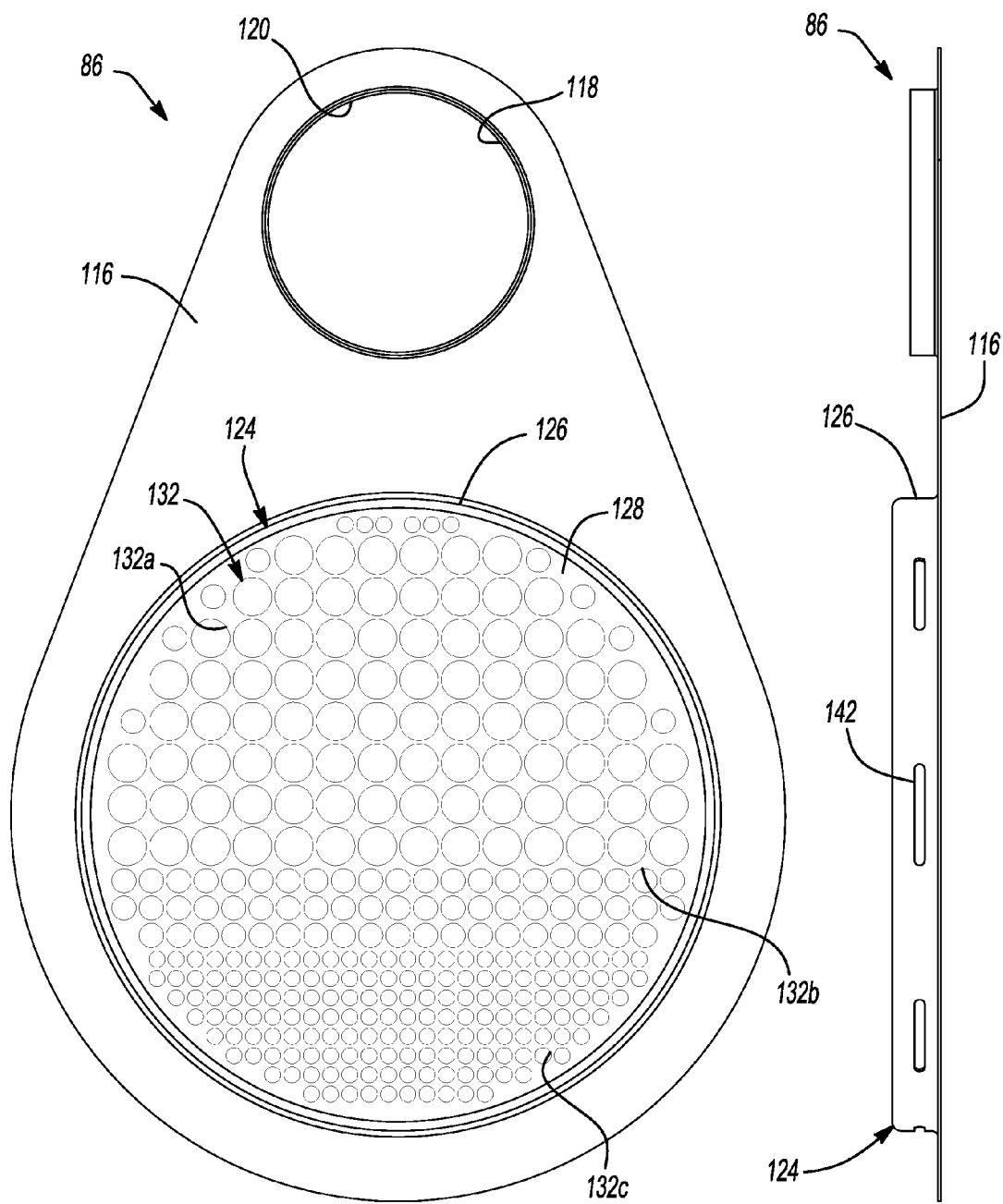

EXHAUST AFTERTREATMENT DEVICE WITH INTEGRATED SHELL AND BAFFLE

FIELD

The present disclosure relates to an exhaust treatment device for reducing undesirable emissions from an internal combustion engine and, in particular, to a simplified insulated housing for the exhaust treatment device.

BACKGROUND

This section provides background information related to the present disclosure which is not necessarily prior art.

Exhaust gas treatment devices such as catalytic converters, diesel oxidation catalysts, diesel particulate filters, and the like, may be employed in various applications to treat exhaust gases emitted from internal combustion engines. Many of the gas treatment devices include inner and outer housings separated by insulation. Furthermore, several exhaust treatment device housings include multiple panels or sections to define different chambers or mix fluids within the exhaust treatment device.

Typical housings are formed using stamped metal sheets to define split or "clam shell" designs. As such, inner housings and outer housings may be formed from separate clam shell components. Additional stampings may be formed and welded to the clam shells to provide an exhaust inlet, and exhaust outlet and sometimes another inlet for injecting reagents into the exhaust stream. Exhaust treatment device housings have become relatively complex, costly and difficult to assemble. Accordingly, it may be desirable to provide an improved exhaust treatment device having reduced size, cost and complexity.

SUMMARY

This section provides a general summary of the disclosure, and is not a comprehensive disclosure of its full scope or all of its features.

An exhaust treatment device includes an inner shell, an outer shell and insulation material positioned between the inner shell and the outer shell. An inlet tube has an end in communication with a cavity defined by the inner shell. A substrate for treating engine exhaust is positioned within the inner shell. A baffle plate includes a plurality of apertures positioned such that the exhaust passes through the apertures prior to entering the substrate. The baffle plate supports an end of the inner shell and the inlet tube.

An exhaust treatment device includes an outer shell having an outer tubular body coupled to an outer hood. An inner shell includes an inner tubular body coupled to an inner hood. An insulation material is sandwiched between the inner shell and the outer shell. An inlet tube has an end in communication with a cavity defined by the inner shell. A substrate is positioned within the inner shell for treating engine exhaust. An inlet plate is fixed to the inlet tube and the outer tubular body. A baffle plate extends substantially parallel to the inlet plate, is fixed to an end of the inner tubular body and supports an end of the inlet tube. The baffle plate includes a plurality of apertures positioned such that the exhaust flowing through the inlet tube turns 180 degrees to pass through the apertures prior to entering the substrate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is top view of a baffle plate;

FIG. 4 is a side view of the baffle plate;

Corresponding reference numerals indicate corresponding parts throughout the several views of the drawings.

DETAILED DESCRIPTION

Figure 1:
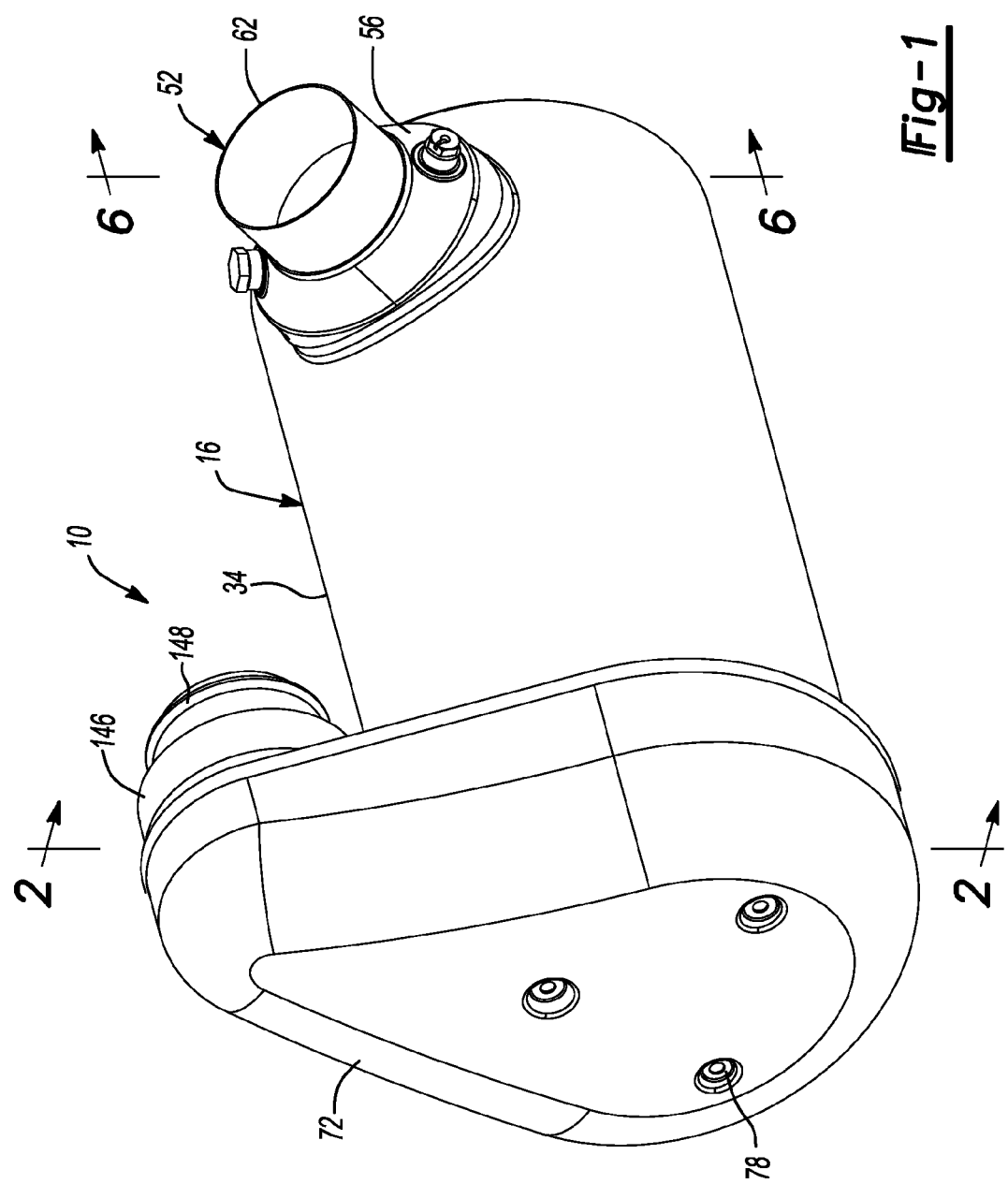
FIG. 1 is a perspective view of an exhaust treatment device constructed in accordance with the principles of the present disclosure.

Example embodiments will now be described more fully with reference to the accompanying drawings.

FIGS. 1-8 depict an exemplary exhaust treatment device identified at reference numeral 10. Exhaust treatment device 10 includes a first substrate 12 positioned upstream of a second substrate 14 within a housing 16. First substrate 12 may be a diesel oxidation catalyst or a selective catalytic reduction device while second substrate 14 may be a diesel particulate filter or a slip catalyst. Other exhaust treatment elements may be used in lieu of first substrate 12 and second substrate 14. Furthermore, the present disclosure relates to an exhaust treatment device that includes one or more substrates within housing 16. The two substrate arrangement depicted in the Figures is merely for illustration purposes.

Housing 16 includes an inner shell assembly 18 including a central tube 20 fixed to an inner inlet 22 and an inner outlet 24. First substrate 12 and second substrate 14 are retained within inner shell 18 using a stuffing or sizing process for compressing a first mat 28 between first substrate 12 and central tube 20, as well as compressing a second mat 30 between second substrate 14 and central tube 20. Housing 16 also includes an outer shell 34 circumscribing inner shell 18. An insulation material 36 surrounds inner shell 18 and is positioned between outer shell 34 and inner shell 18.

An inner end cap 42 includes a flange 48 fixed to inner outlet 24. An insulation material 46 is trapped between inner end cap 42 and an outer end cap 44. Outer end cap 44 includes a flange 50 fixed to outer shell 34. Inner end cap 42 is fixed to outer end cap 44. An outlet pipe assembly 52 includes an outer pipe 56 fixed to an inner pipe 54. An insulation material 57 is positioned between the inner and outer pipes. Inner pipe 54 includes a first end 58 extending through both outer shell 34 and inner shell 18 in communication with a cavity 60 formed downstream of second substrate 14. An outlet 62 is formed at the second opposite end of outlet pipe assembly 52.

An outer hood 72, an inner hood 74, and an insulation material 76 cooperate to enclose the end of inner shell assembly 18 and outer shell 34 opposite inner end cap 42. Outer hood 72 includes a plurality of inwardly extending protrusions 78 each including an aperture 80 extending therethrough. Inner hood 74 includes a plurality of outwardly extending protrusions 82 positioned to engage inwardly extending protrusions 78 of outer hood 72. A baffle plate 86 cooperates with an inlet plate 88, an inlet tube 90 and inner hood 74. Inlet plate 88 includes a substantially planar portion 96 having a first aperture 100 defined by a first flange 102 extending therethrough. A second aperture 104 is defined by a second flange 106. A peripheral third flange 108 circumscribes planar portion 96.

Baffle plate 86 includes a substantially planar panel 116 having an aperture 118 defined by a flange 120 extending therethrough. An axially protruding boss 124 includes a cylindrical wall 126 intersecting an end face 128 and planar panel 116. A plurality of apertures 132 extend through end face 128. The apertures vary in size with apertures 132a having a larger diameter than apertures 132b that also have a larger diameter than apertures 132c. Apertures 132a having the largest diameter are positioned at a location closest to inlet tube 90 where the exhaust pressure is the lowest. The smallest diameter apertures 132c are positioned furthest from inlet tube 90 where the exhaust pressure is the greatest. The intermediate sized apertures 132b are positioned at a location of intermediate exhaust pressure. By arranging and sizing the apertures in this manner, a substantially consistent flow of exhaust will enter a cavity 136 between baffle plate 86 and an upstream end 138 of first substrate 12. A plurality of circumferentially spaced apart slots 142 extend through cylindrical wall 126 to aid in assembly as will be described in greater detail. An insulation material 144 circumscribes inlet tube 90 and is trapped between planar panel 116 of baffle plate 86 and planar portion 96 of inlet plate 88. An inlet escutcheon 146 is fixed to inlet tube 90 and inner plate 88. An insulation material 147 is trapped between inlet tube 90 and inlet escutcheon 146. An inlet flange 148 is formed near an end of inlet tube 90 to facilitate coupling exhaust treatment device 10 to an exhaust conduit (not shown). Baffle 86 is spaced apart from outer hood 72 to provide a thermal break 149 between inner shell 18 and outer hood 72.

Exhaust treatment device 10 has been configured to minimize the number of components required to define housing assembly 16. When manufacturing housing assembly 16, it is contemplated that a particular assembly process may be useful for constructing a robust assembly suitable for years of service. The manufacturing/assembly process of treatment device 10 may begin by stamping, forming or otherwise obtaining the components previously introduced. Inlet escutcheon 146 is positioned over inlet tube 90 and welded thereto. Inlet escutcheon 146 is inserted into second aperture 104 defined by flange 106. Inlet escutcheon 146 is also welded to flange 106.

The assembly of inlet plate 88 and inlet tube 90 may now be coupled to outer shell 34 by welding first flange 102 to outer shell 34. Insulation material 144 is placed around inlet tube 90. Baffle plate 86 is positioned such that inlet tube 90 extends through aperture 118. Inlet tube 90 may be sized such that a press-fit interconnection exists between an outer surface of inlet tube 90 and flange 120 of baffle plate 86. An end of inner inlet 22 is received within a hollow formed by boss 124 such that the cylindrically shaped wall of inner inlet 22 is adjacent cylindrical wall 126 of baffle plate 86. Baffle plate 86 is fixed to inner shell 18 by welding tabs in slots 142 circumferentially spaced apart from one another.

Figure 2:
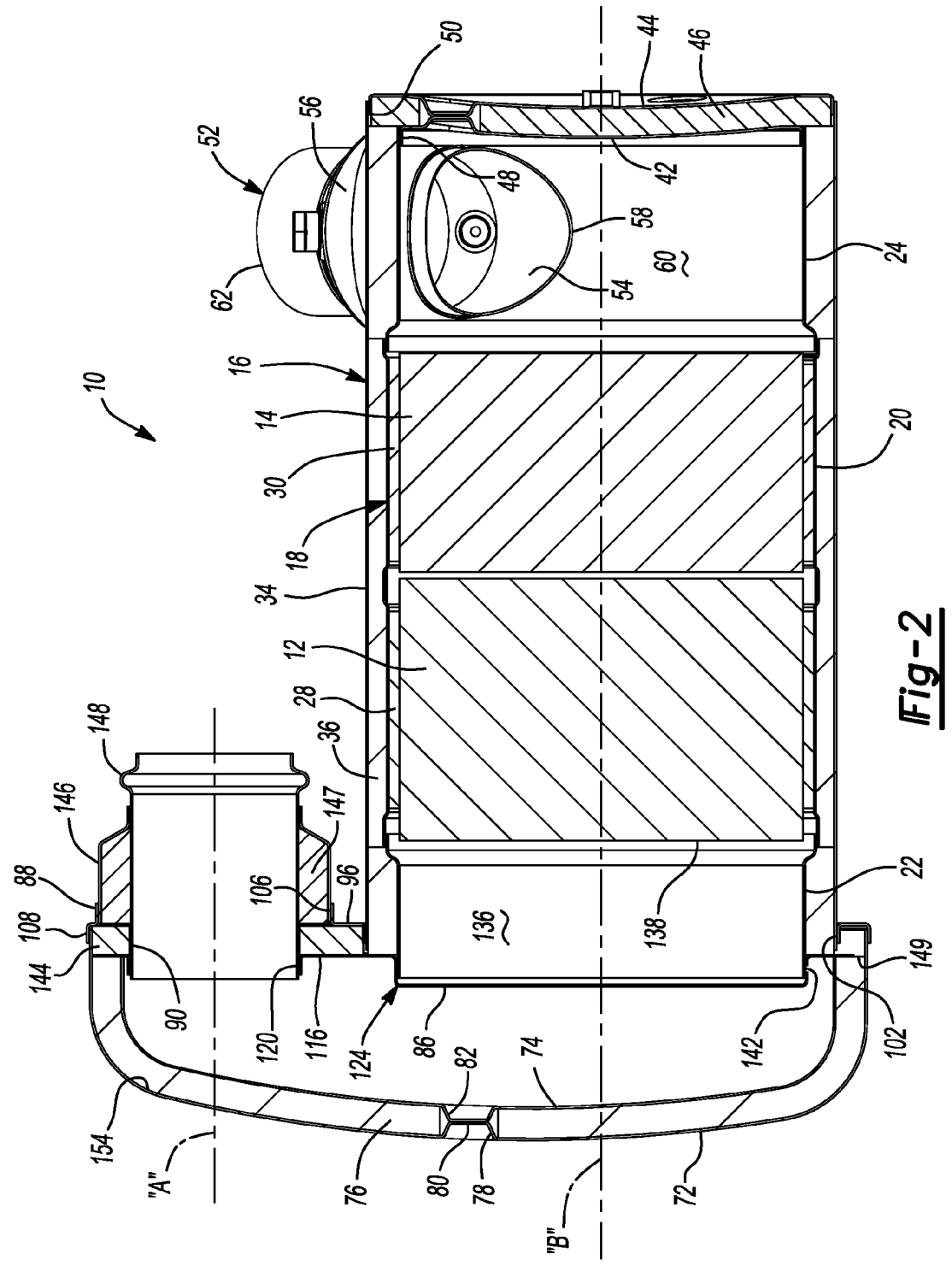
FIG. 2 is a cross-sectional view of the exhaust treatment device.
Figure 5:
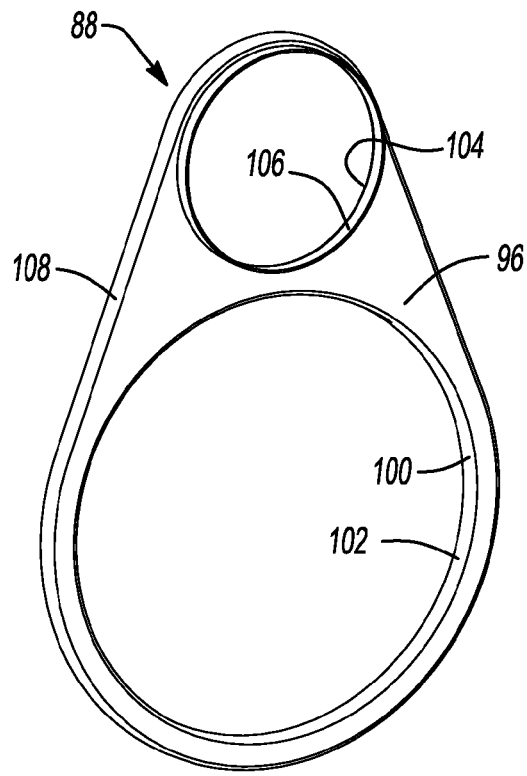
FIG. 5 is a perspective view of an inlet plate.
Figure 6:
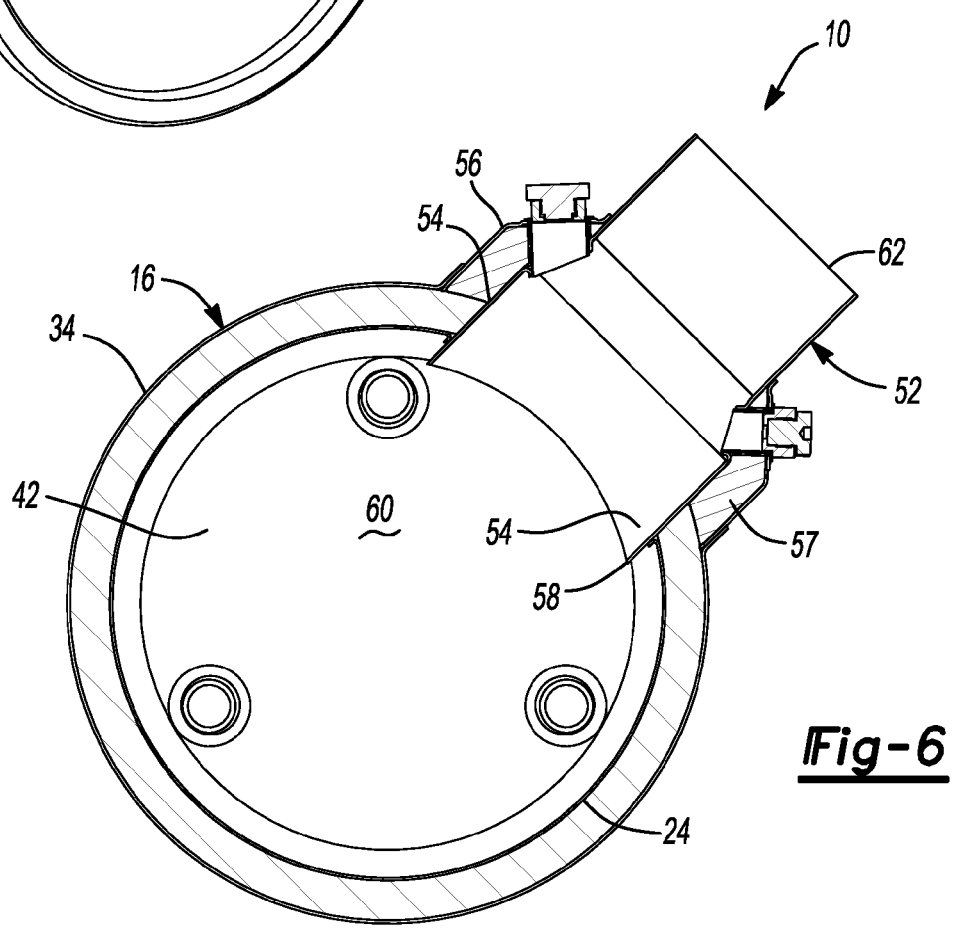
FIG. 6 is a cross-sectional view through the exhaust treatment device.
Figure 7:
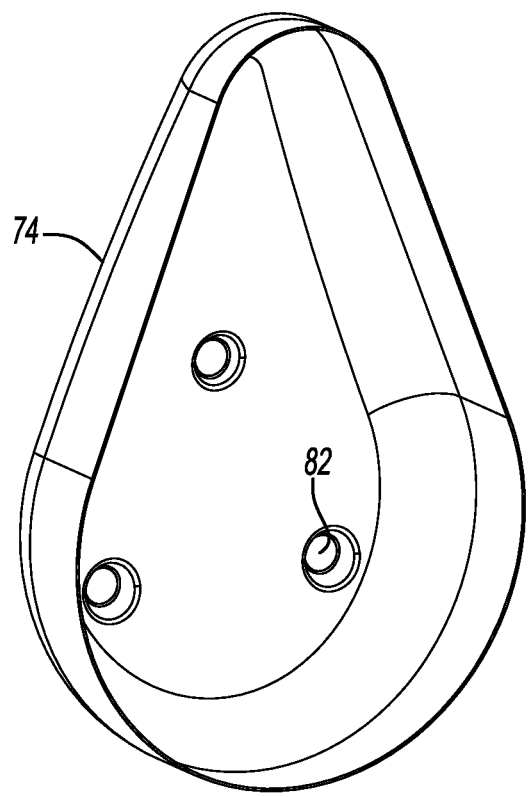
FIG. 7 is a perspective view of an inner hood.
Figure 8:
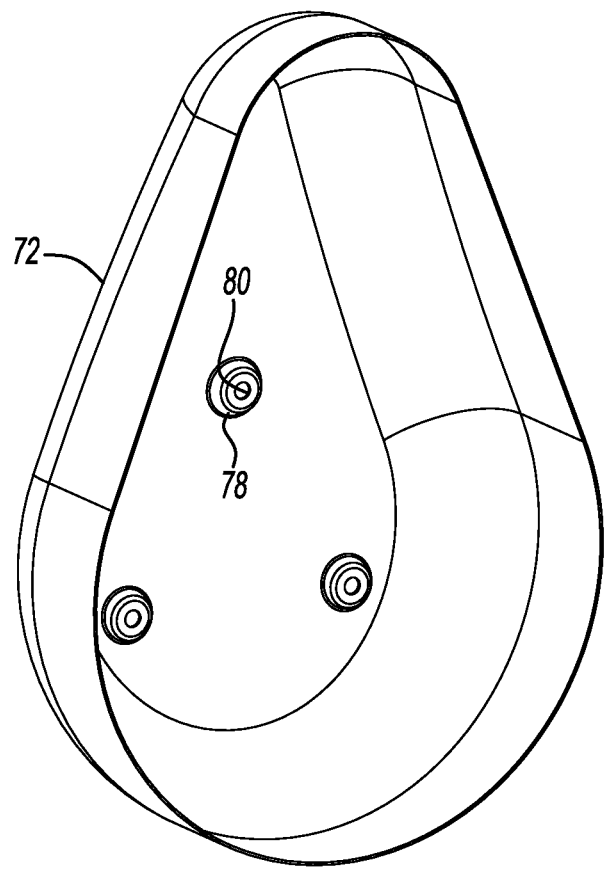
FIG. 8 is a perspective view of an outer hood.

At this point of the process, inlet plate 88, inlet tube 90 and baffle plate 86 are coupled to inner shell 18 and outer shell 34. Inner hood 74 is positioned as shown in FIG. 2 and welded to baffle plate 86 at locations where flange 120 or cylindrical wall 126 are adjacent to inner hood 74. Insulation material 76 is placed into contact with an inner surface 154 of outer hood 72. Outer hood 72 and insulation material 76 are moved into position to trap insulation material 76 between inner hood 74 and outer hood 72. Outer hood 72 is welded to third flange 108 of inlet plate 88. Inwardly extending protrusions 78 are welded to outwardly extending protrusions 82. Apertures 80 are filled with weld rod material by a process such as plug welding or seal welding.

Inner pipe 54 is positioned to extend through outer shell 34 and inner shell 18 to place first end 58 in communication with cavity 60. Inner pipe 54 is press-fit to inner shell 18. Insulation material 57 is wrapped around an outer surface of inner pipe 54. Outer pipe 56 is positioned to circumscribe inner pipe 54 and is seal welded to outer shell 34.

It should be appreciated that the previously described process and structural configuration of exhaust treatment device 10 reduces the overall size of the device. More particularly, an offset distance between an inlet axis identified at "A" and a substrate axis identified at "B" is greatly reduced compared to competitive devices. The present arrangement allows a distance between axis A and axis B to be substantially less than or equal to the sum of a radius of the outer shell and an inner diameter of the inlet tube. The configuration of exhaust treatment device 10 also provides an outer shell spaced apart from an inner shell by an insulation material to maintain the energy content of the exhaust within exhaust treatment device 10 and minimize the external skin temperature of the device. The present disclosure describes this insulation arrangement being located at interconnections at and around inlet tube 90 and outlet pipe assembly 52 that were typically not insulated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust treatment device, comprising:
   an inner shell;
   an outer shell;
   an insulation material positioned between the inner shell and the outer shell;
   an inlet tube having an end in communication with a cavity defined by the inner shell;
   a substrate for treating engine exhaust positioned within the inner shell; and
   a baffle plate including a plurality of apertures positioned such that the exhaust passes through the apertures prior to entering the substrate, the baffle plate supporting an end of the inner shell and the inlet tube, wherein the baffle plate includes a tubular wall portion surrounding the inner shell, the tubular wall portion including a plurality of circumferentially spaced apart slots in receipt of welds to the inner shell.

2. The exhaust treatment device of claim 1, wherein the baffle plate includes a circumferentially extending flange engaging the inlet tube.

3. The exhaust treatment device of claim 2, wherein the baffle plate includes a recess in receipt of the end of the inner shell.

4. The exhaust treatment device of claim 3, further including an inlet plate including a first aperture in receipt of the inlet tube and a second aperture in receipt of the outer shell.

5. The exhaust treatment device of claim 4, wherein the inlet tube is press-fit to the baffle plate.

6. The exhaust treatment device of claim 5, wherein the baffle plate and the inlet plate extend substantially parallel and spaced apart from one another.

7. The exhaust treatment device of claim 6, further including an insulation material positioned between the baffle plate and the inlet plate.

8. The exhaust treatment device of claim 7, further including a compressible mat positioned between an outer surface of the substrate and an inner surface of the inner shell.

9. The exhaust treatment device of claim 1, wherein an axis of exhaust flow defined by the inlet tube extends substantially parallel to an axis of exhaust flowing through the substrate, the axes being offset a distance substantially less than or equal to the sum of a radius of the outer shell and an inner diameter of the inlet tube.

10. An exhaust treatment device, comprising:
an outer shell including an outer tubular body coupled to an outer hood;
an inner shell including an inner tubular body coupled to an inner hood;
an insulation material sandwiched between the inner shell and the outer shell;
an inlet tube having an end in communication with a cavity defined by the inner shell;
a substrate positioned within the inner shell for treating engine exhaust;
an inlet plate fixed to the inlet tube and the outer tubular body; and
a baffle plate extending substantially parallel to the inlet plate, being fixed to an end of the inner tubular body and supporting an end of the inlet tube, the baffle plate including a plurality of apertures positioned such that the exhaust flowing through the inlet tube turns 180 degrees to pass through the apertures prior to entering the substrate, wherein the baffle plate includes a tubular wall portion surrounding the inner shell, the tubular wall portion including a plurality of circumferentially spaced apart slots in receipt of welds to the inner shell.

11. The exhaust treatment device of claim 10, wherein the baffle plate includes a recess in receipt of an end of the inner shell.

12. The exhaust treatment device of claim 11, wherein the baffle plate includes a circumferentially extending flange engaging the inlet tube.

13. The exhaust treatment device of claim 12, wherein the inlet tube is press-fit to the baffle plate.

14. The exhaust treatment device of claim 13, further including an insulation material positioned between the baffle plate and the inlet plate.

15. The exhaust treatment device of claim 10, further including another substrate positioned within the inner shell downstream of the substrate.

16. The exhaust treatment device of claim 15, wherein all of the exhaust flowing through the inlet tube passes through both substrates.

17. The exhaust treatment device of claim 10, wherein the outer hood includes a plurality of inward projections fixed to a plurality of outward projections on the inner hood, a majority of the inner hood extending substantially parallel to the baffle plate.

* * * * *